(12) United States Patent
Gibson (10) Patent No.: US 9,092,778 B2
(45) Date of Patent: Jul. 28, 2015

(54) BANK ACCOUNT PROTECTION METHOD UTILIZING A VARIABLE ASSIGNING REQUEST STRING GENERATOR AND RECEIVER ALGORITHM

(71) Applicant: Jeffrey S. Gibson, Tyronza, AR (US)

(72) Inventor: Jeffrey S. Gibson, Tyronza, AR (US)

(73) Assignee: VARSGEN, LLC, Memphis, TN (US)

( * ) Notice: Subject to any disclaimer, the term of this patent is extended or adjusted under 35 U.S.C. 154(b) by 0 days.

(21) Appl. No.: 14/094,796

(22) Filed: Dec. 3, 2013

(65) Prior Publication Data

US 2014/0279529 A1 Sep. 18, 2014

Related U.S. Application Data

(60) Provisional application No. 61/802,347, filed on Mar. 15, 2013.

(51) Int. Cl.
G06Q 20/00 (2012.01)
G06Q 20/38 (2012.01)
G06Q 20/40 (2012.01)

(52) U.S. Cl.
CPC ........ *G06Q 20/3821* (2013.01); *G06Q 20/4016* (2013.01)

(58) Field of Classification Search
USPC .......................................................... 705/76
See application file for complete search history.

(56) References Cited

U.S. PATENT DOCUMENTS

| | | |
|---|---|---|
| 5,538,291 A | 7/1996 | Gustafson |
| 5,708,422 A | 1/1998 | Blonder et al. |
| 5,955,961 A | 9/1999 | Wallerstein |
| 7,076,657 B2 | 7/2006 | Koukoulidis et al. |
| 7,357,310 B2 | 4/2008 | Calabrese et al. |
| 7,428,502 B2 | 9/2008 | Horton |
| 7,440,915 B1 | 10/2008 | Ulrich |
| 7,454,004 B2 * | 11/2008 | Shvadron ................ 379/210.01 |
| 7,657,736 B2 | 2/2010 | Godfrey et al. |

(Continued)

OTHER PUBLICATIONS

Bin Lu, and Udo W. Pooch, A Lightweight Authentication Protocol for Mobile Ad Hoc Networks, International Journal of Information Technology, pp. 119-135, vol. 11, No. 2, Department of Computer Science Texas A&M University, College Station, Texas 77843-3112, USA.

(Continued)

*Primary Examiner* — Zeshan Qayyum
(74) *Attorney, Agent, or Firm* — William S. Parks; Wyatt, Tarrant & Combs, LLP (57) ABSTRACT

A novel method of substantially, if not totally, eliminating financial account fraud through the implementation of a specific algorithm that permits a financial institution the means to communicate directly and nearly instantaneously with an account holder for verification purposes during a financial transaction. The overall system depends on a string variable method that accords a limited number of representations to all the words and numbers of a specific human language in order to provide a suitable machine language translation for the capability of communicating quickly and effectively between a financial institution, an account holder, and possibly, a third party. Through a link between the digital communication platform set up by the variable string algorithm between the financial institution's system and at least one account holder electronic device, such communications, which do not require any need to divulge personal or other information of the account holder, ensure such transactions are proper.

20 Claims, 2 Drawing Sheets

(56) References Cited

U.S. PATENT DOCUMENTS

| | | | |
|---|---|---|---|
| 7,827,406 B2 | 11/2010 | Brown et al. | |
| 7,937,299 B1 | 5/2011 | Ahles et al. | |
| 7,974,234 B2 | 7/2011 | Gustave | |
| 8,065,235 B2 | 11/2011 | Narayanaswami et al. | |
| 8,099,077 B2 | 1/2012 | Chowdhury et al. | |
| 8,205,084 B2 | 6/2012 | Godfrey et al. | |
| 8,244,592 B2 | 8/2012 | Nihalani et al. | |
| 8,285,648 B2 | 10/2012 | Goodin | |
| 8,291,212 B2 | 10/2012 | Godfrey et al. | |
| 8,386,333 B2 | 2/2013 | Sonderregger et al. | |
| 8,392,986 B1 | 3/2013 | Gossweiler, III | |
| 2002/0046055 A1 | 4/2002 | Martino et al. | |
| 2002/0099648 A1 | 7/2002 | DeVoe et al. | |
| 2002/0111886 A1* | 8/2002 | Chenevich et al. | 705/30 |
| 2004/0117320 A1 | 6/2004 | Morioka et al. | |
| 2004/0117623 A1 | 6/2004 | Kalogridis et al. | |
| 2005/0033960 A1 | 2/2005 | Vialen et al. | |
| 2005/0165684 A1* | 7/2005 | Jensen et al. | 705/44 |
| 2005/0177469 A1 | 8/2005 | Vallinen et al. | |
| 2006/0195532 A1 | 8/2006 | Zlateff et al. | |
| 2006/0209789 A1 | 9/2006 | Gupta et al. | |
| 2007/0100773 A1* | 5/2007 | Wallach | 705/75 |
| 2008/0011825 A1* | 1/2008 | Giordano et al. | 235/380 |
| 2009/0012898 A1 | 1/2009 | Sharma et al. | |
| 2009/0129573 A1* | 5/2009 | Gavan et al. | 379/189 |
| 2009/0282251 A1 | 11/2009 | Cook et al. | |
| 2010/0299525 A1 | 11/2010 | Shah et al. | |
| 2011/0035320 A1 | 2/2011 | Perlman et al. | |
| 2011/0231646 A1 | 9/2011 | Brown et al. | |
| 2011/0276636 A1 | 11/2011 | Cheng et al. | |
| 2012/0131121 A1 | 5/2012 | Snyder et al. | |
| 2012/0221470 A1 | 8/2012 | Lyon | |
| 2013/0007459 A1 | 1/2013 | Godfrey et al. | |

OTHER PUBLICATIONS

Masoumeh Purkhiabani and Ahmad Salahi Enhanced Authentication and Key Agreement Procedure of Next Generation 3GPP Mobile Networks, Manuscript received Aug. 20, 2011; revised Oct. 27, 2011.

B. Sridevi, M. Brindha, R. Umamaheswari, Dr. S. Rajaram, Implementation of Secure & Cost Effective Authentication process in IEEE 802.16e WiMAX, International Journal of Distributed and Parallel Systems (IJDPS), Mar. 2012, pp. 215-229, vol. 3, No. 2.

SAFENET, SMS Authentication: 10 Things to Know—Before You Buy White Paper, pp. 1-4.

Tower Group, SMS in Financial Services: Accessing Your Customers on Their Terms. pp. 1-14.

* cited by examiner

BANK ACCOUNT PROTECTION METHOD UTILIZING A VARIABLE ASSIGNING REQUEST STRING GENERATOR AND RECEIVER ALGORITHM

CROSS-REFERENCE TO RELATED APPLICATION

This application claims priority of U.S. Provisional Patent Application 61/802,347, filed on Mar. 15, 2013, the teachings and disclosure thereof herein entirely incorporated by reference.

FIELD OF THE INVENTION

The present invention pertains to a novel method of substantially, if not totally, eliminating financial account (credit/debit/checking/savings/retirement/investment accounts) fraud through the implementation of a specific algorithm that permits a financial institution (or its proxy) the means to communicate directly and nearly instantaneously with an account holder (at multiple contact points) for verification purposes during a financial transaction. The overall system depends on a string variable method that accords a limited number of representations to all the words and numbers of a specific human language in order to provide a suitable machine language translation for the capability of communicating quickly and effectively between a financial institution, an account holder, and possibly, an outside third party. Such a process allows for instantaneous and reliable recognition and identification of an account holder simply by initiating electronic communication between such an entity and the pertinent financial institution. Through a simple link between the digital communication platform set up by the variable string algorithm between the financial institution's system and at least one account holder electronic device, and initiated to match the identity of at least one verification contact point to ensure the trustworthiness of a financial transaction involving the subject financial account itself, such communications, which do not require any need to divulge personal or other information of the account holder, ensure such transactions are proper. The ability to do so with substantially instantaneous, low-bandwidth communications provides a method that accords protection to all entities involved with minimal interruption for greater efficiencies, as well.

BACKGROUND OF THE PRIOR ART

The continued utilization and growth of electronic bank account transactions (such as checking, savings, debit, and credit types, for instance) has led to an undesirable increase in account invasions and thefts, leaving banks and other financial institutions with huge potential liabilities and losses. Additionally, some consumers have been susceptible to credit rating problems due to the unauthorized use of individuals' stolen bank account (for example, credit card) information. In essence, criminal activity involving concerning electronic financial account information, particularly in this age of computerized systems for such transactions, is substantial and causes enormous problems around the globe, tallying well into the billions in terms of annual cash losses. Of particular concern are situations that do not allow for financial institutions to guarantee remedies to account holders (such as for on-line checking account deductions; banks are typically not liable for any electronic thefts due to outside invasions of account information), since the innocent and unsuspecting account holder may be out a significant amount of money.

Certainly, such accounts are highly convenient and widely used; from the ease of transfer at gasoline pumps to swiping cards at retail establishments, even utilizing such payment systems to transact business over the Internet, debit/credit cards, e-checks, and other like accounts are utilized everyday by millions (if not billions) of people worldwide. In the computer realm, however, the information embedded within such accounts (and in particular cards) is a constant lure for unsavory actors. From the potential for accessing an individual's credit card identifications (such as account numbers, expiration dates, even extra access codes) through hacking operations, to planting insurgent devices to read magnetic strip records, to utilizing surreptitious cameras, and the like, to uncover an individual's inputted password or pass code information, there is a constant barrage from criminal enterprises to steal such information in as widespread fashion as possible. Even within certain settings, such as, for instance, restaurants, and the like, the trust a patron places on a server or like individual with his or her debit/credit card has, on occasion, led to theft of such information through unauthorized copying and use. Once such information is in a criminal's possession, such thieves can purchase thousands of dollars worth of merchandise within mere minutes, and the unsuspecting consumer eventually pays one way or another. Whether through account payments or price increases absorbed by multiple consumers in the long run, the financial institution and/or the retailer seeks recompense for such stolen moneys as well, particularly since such theft costs are typically charged back to the retailer (about 80%, generally, at least). In any event, such criminal actions will undoubtedly continue unabated as debit, credit, checking, savings, retirement, investment, etc., account information modifications have been slow to enter the financial industry, leaving such accounts susceptible to mere copying by sight or through digital signal interception, as some examples. Thus, it is evident that there continues to be a rather significant need to provide some means to avert the unauthorized use of such stolen bank account information, whether if procured in front of the account holder or through other illegal, surreptitious means. The ability to do so through a non-invasive method that provides a high degree of reliability for both the account holder and account backer would be highly prized, certainly.

There have been many attempts to prevent the illegal or fraudulent use of credit cards and/or debit cards in shopping malls, over the Internet, and at Automated Teller Machines (ATMs). These efforts include Personal Identification Numbers (PINs), the use of mother's maiden names (or other specific information) as a secret identification, and requiring credit/debit card holders to use additional ID cards such as a driver license. All attempts to use static information such as these are not completely secure, since such information can be easily learned or stolen and passed on to other users. Once the static identification number is learned, it may be used to make fraudulent debit/credit card purchases until the fraud is detected and the debit/credit card account is closed.

In addition to the PIN system mentioned above, the CVV (card verification and validation) number is an additional security system currently in place for purchases using a debit and/or credit card where the card is not physically present, such as for interne or telephone transactions. The CVV number may be alternatively called CVV2 or CID (card identification) or CCV (credit card verification or validation) by various debit/credit card companies. The CVV number is typically printed on the back of the subject card, as with MasterCard or VISA, but may be on the front of the card, as with American Express, as examples. This number typically includes three or four digits. Merchants are not allowed to store CVV numbers in their database with the account number, as a security measure, meaning that, in principle, at least, such numbers will not be disseminated if a merchant's database is compromised. Also, since the CVV number is not in the database, each transaction must be accompanied by a new request for the number from the cardholder. Nevertheless, since the CVV numbers are disclosed to the merchants, their employees, and anyone in the communications chain, they may easily be recorded and passed on in a fraudulent manner. Not to mention, in certain establishments, such as restaurants, the permissive grant, temporarily, of one's debit and/or credit card to a server or like employee for the purpose of payment at a specific financial transfer device location allows ample opportunity for a person to review and record all such necessary information to then utilize the card at a future date and time.

Alternatively, there are other nefarious operations that attempt to prod such account information from unsuspecting individuals. For example, phishing has become a standard manner of having unsophisticated persons actually provide their bank account information to unidentified on-line actors posing as a trustworthy institution or entity. In such an exercise, for example, an unexpected email or other communication may be sent to an individual indicating a problem or issue has arisen with his or her account. In order to remedy such a situation, the phishing site (a link, for instance, within an email) that appears affiliated with the individual's bank or like entity, will request verification of identity through the input of information such as the individual's name, account number, other protected information (such as a password, social security number, etc.), even addresses, as examples. Once such information is unwittingly shared, the bad actor can then access the individual's account(s) and electronically steal as many assets as desired, particularly since such an actor now has all the necessary verification information of the account holder him- or her-self.

Additionally, there are currently devices of relatively low cost that may be employed surreptitiously by a bad actor to read and/or swipe embedded information from a person's card or cards via the magnetic strips, chips, or other like card information storage devices present thereon. Such reader devices may be placed in card readers that are typically accessed by consumers for payment purposes, or even within ATMs. Furthermore, however, and far more sinister, are devices that may be utilized in such a secretive fashion as to "bump" against a person's pocket or handbag (or the like) and automatically read such embedded card information. The information is thus instantly transferred to the device from which the bad actor(s) may make a copy (or copies) thereof in a new card, allowing for implementation within the new card's own magnetic strip (or like storage device). In such a fashion, the bad actor(s) can access the account through such stolen information and without the need for any further verification (since the user in that instance, being the bad actor, has the card information in hand and the standard purchasing/ transferring protocols followed today require nothing further for most retail establishments, at least, to accept such a presentation).

Even more interesting is the potential for a funds transfer system to be supplied within a person's on-line account (such as Google, Pay Pal, etc.) or permitted through access from a person's phone alone (such as Google Wallet, Google Money, and the like), which actually store and utilize the person's own underlying financial accounts (whether checking, savings, credit, debit, retirement, etc., in nature). If such an on-line account is hacked or the phone is stolen, the bad actor may easily access all the underlying financial accounts linked thereto to withdraw and/or use such funds, or even just utilize the on-line system itself to make purchases, transfers, etc., on demand. Password technology is currently used to protect such possible problems, but, as noted above, sophisticated bad actors can detect and/or discover such information (even through answering certain general questions, the answers to which may be easily understood or at least uncovered). As such, mere hacking or physical theft could lead to such financial account invasions. If the phone or on-line account user leaves an email or other account open on his or her computer or phone, then the bad actor's accomplishments in this manner are made that much easier. Furthermore, such a bad actor could also set up new accounts in this type of theft situation, particularly if certain background information (social security number, etc., for example) has also been absconded with, thereby allowing for further fraudulent activity in this manner, all through a hard-to-detect new unauthorized account.

Some banks and other card providers have a monitoring system in place to at least attempt to prevent suspicious activity. For instance, the utilization of a card in a foreign location, for a rather large purchase, or other like potentially unlikely situation, may trigger a financial institution to call or otherwise try to communicate directly with the card holder for verification purposes. If such a communication fails to reach the card holder, the transaction may be held pending a reliable response. However, if the number involved, for example, is picked up by the bad actor in such an instance (such as through a stolen phone or even if the person is at the card holder's own home), then the financial institution, despite attempts to prevent such a problematic occurrence, may be forced to pay for such a mistaken identity (regardless of the malfeasance involved). Even more troublesome is that such suspicious activities have been uncovered through the utilization of certain algorithms by the subject financial institution searching for anomalies in account use. Unfortunately, though, some criminals have developed (or have had developed) similar programs to emulate these anomaly-searching types of financial institutions' in order to predict such situations and thus to provide initial warnings of probable unacceptable account activity in relation to the financial institution operations. In this manner, these bad actors are provided with a means to avoid such questionable account transactions (whether geographic location, threshold amount, type of merchant, etc.) and undertake those that will more likely be accepted, thereby skirting the supposed failsafe measures currently in place. Additionally, a typical operation known as "cramming" involves the accumulation of small charges ($10-50, for instance) sporadically over a significant time period so as to increase the chances that such actions go unnoticed by both the account holder and the financial institution, particularly if monitoring by either party is limited. In essence, in each situation, the criminal element has realized a means to evade the security measures implemented by the financial institutions; there are thus great needs, again, to overcome these potential pitfalls.

Of particular importance is the typical scenario wherein the financial institution (bank or creditor, for example) detects suspicious activity and tries to contact the account holder. If such a communication fails (at least at that moment, such as if the account holder is asleep or otherwise indisposed), then much of the time the actual transaction is actually processed (depending, for instance, on the amount of money involved; the lower the amount, the more likely the transaction will proceed to any inconvenience at that time for either the presenter or the retailer). Otherwise, the potential for an interruption during the communication attempt may prove problematic to the degree that any account suspension due to such glitches may be too great a problem for the bank/creditor to want to cause such possible distress and/or other inconvenience to the account holder customer. As such, it is currently a common exercise to avoid such temporary suspensions unless proper communication is achieved or, alternatively, if the transaction is below a certain amount threshold, as noted above.

Furthermore, other systems have been developed that try to implement verification processes (passwords, etc., for example) to permit further financial account activity. However, even the most advanced versions of these systems utilize a single certification point and require the use of an easily (in most instances, at least) stolen password to verify identity. Even if verifications are attempted, particularly if there is questionable activity involved, certain communication platforms may still be insufficient to thwart unwanted and potentially criminal activity. For instance, the simplest of communication operations, such as SMS notifications, may still not get to the actual user until after a suspicious credit card transaction occurs. The lack of any other verification techniques for such a purpose leaves the financial institution, and the user, for that matter, at the mercy of almost happenstance; if the user is, again, not by or near his or her phone, or not at another registered phone or other communication device (even if the communication is made by email, text, etc.), then the entire transaction will fail. If it is an actual desired transaction (if it is true in that sense), it could be prevented rather than permitted, leaving the actual, verifiable user unable to complete a transaction. In other words, the systems currently in place are noticeably deficient in that they either provide too stringent a system of protection (leaving, again, the account holder/user at the mercy of having a communication device that is, for instance, fully powered, at the point of purchase, for verification purposes) or a system that could permit a bad actor too easy a manner of avoiding the preventive measures sought through such a base security procedure. In those instances, it could be, for instance, greater than 24 hours before such a fraud is noticed, leaving, again, all the entities involved at the mercy of a fraud already committed by someone (or many persons) (or some entity), leaving an innocent party (or parties) forced to pay for such an illegal transaction.

Further attempts to protect account information during transactions include the implementation of a verification enrollment program involving a merchant and an account holder. Such a program allows for such parties to utilize a verification technique whereby the merchant notifies an intermediate verifier that has access to the account holder's communication device number in order to call and request input of a specific pass code. The system requires the account holder to download an application unto a specific communication device to link with the verifier; the merchant must also utilize the verifier service in this manner for the overall system to function properly, apparently, as well. Upon request of a transaction, the system realizes the account holder's information and automatically communicates with the enrolled communication device and awaits input of the aforementioned pass code. If the pass code matches a stored pass code, then the merchant is allowed to proceed with the transaction. Although such a system appears viable on its face, in actuality it is open to many attacks by a bad actor, particularly since such verifications are limited to a single contact point. If the communication device (such as a cell phone, for instance) has been stolen, the potential to uncover the pass code through analysis of past inputs leaves the user susceptible to identity theft. Additionally, a bad actor has the capability of forwarding the necessary communication link to another device if access to the enrolled device has been permitted (even after return of a stolen phone, for instance, particularly in a surreptitious situation wherein the initial enrollee does not realize such has occurred). If an account number has been stolen, as well, and the pass code has been uncovered, as noted above, then the bad actor may still have the capability of raiding the enrollee's account, unbeknownst to either the account holder or the merchant. Otherwise, the overall limitations of such a system are further noticed as there is always a need to, apparently, have the account holder provide the pass code verification in person and/or in public, leaving the possibility that a bad actor may view such an input. Additionally, the system does not take into account the financial institution itself; if a bad actor undertakes such a possible illegal theft scheme, there is no prevention of liability on behalf of the financial institution itself. Lastly, the overall system is taxing to undertake in terms of bandwidth; in actuality, the utilization of short message service (SMS) pathways to provide such verification capabilities are virtually impossible within such a structured program. The input of information in reply to a specific request must be performed by a party, not through a latent response mechanism. To achieve such a result, larger bandwidth relays are necessary, leaving the system as a rather significant tax on the overall communications systems in place to begin with, as well as one that is highly susceptible to hacking and information theft. As such, these overall downloadable application enrollment processes are extremely limited in effectiveness without significant changes to their basic configurations. As well, these are limited to merchant/account holder transactions and do not provide further protections for other financial transactions that may be sought in other situations.

There have also been proposed (and, in certain locations, implemented) more exotic and technical systems and methods for validating credit card holder identities. However, these systems likewise exhibit significant drawbacks. Some are too complex and require new card types to be issued and/or new merchant hardware for their use, and others are too easily learned and passed on to other users. Others have been avoided by the financial industry due to the necessity of changing such card articles at too great an expense (such as, for instance, including microchips, RF sensors, and the like, within the card bodies). Other activities have included the attempt to couple photos of the user in an on-line environment, at least, to a system present within a retailer's establishment. In all such scenarios, the difficulties in implementation were greater than the industry was willing to withstand, ranging from costs to privacy concerns for the card users themselves.

Basically, it is clear that even within the most advanced system a continuous link is needed in order to verify identity through a mobile device. A password is required and any break in signal causes a transaction to be declined. Such identity verification systems all lack the capability of multiple certification points. They also lack the ability to accept different types of simultaneous verification points such as the requirement of SMS and email verification for a specified transaction, not to mention the ability to leave a transaction as pending while awaiting secondary verification. Overcoming such deficiencies would thus be a benefit for corporate customers and for on-line shopping, at least. Additionally, and in a slightly different vein, such systems also lack the ability to offer certain benefits to card users, such as, for instance, shopping bargains from competitors of a certain store (wherein such competitors may be paying clients of the card holder's backing financial institution or even of the specific internet search engine utilized for a specific on-line shopping transaction). Certainly, pop-up ads and the like may be possible through on-line websites, but to specific cell phones and other like mobile devices, such possibilities are currently lacking, particularly since it is difficult to pinpoint locations correlated to desires of such a potential card-holding, cell phone-carrying, customer (and thus the utilization of ads in this manner directed to such specific individuals, rather than to a widespread population of phone users). Such versatility, particularly in conjunction with a verification system for bank account fraud elimination would be desirable to many consumers. Such base systems, let alone those with this versatile ad supply function, are nonexistent as of today. Furthermore, such typical verification systems also lack the ability of buyer-seller portals for pending on-line transactions for the transfer of desired information before a secondary verification identifier to permit the reliable completion of such a transaction. Finally, there is currently lacking, as well, the ability to provide a central monitoring system for emergency requests sent from bank account customers' cell phones using, as an alternative, at least, solely an SMS platform to reduce bandwidth usage for such necessary communications. In essence, although many resourceful measures for preventing bank account fraud have been published in existing patent literature, none have offered a system in which security may be enhanced with infinite scalability to best ensure verification of identity, etc., of the instant account holder (or, at least, of the instant transferor of account information for a financial transaction).

As such, as outlined above, despite the large amount of attempts for such reliable theft and/or fraud prevention procedures, there remains a distinct need for a simple verification method for ensuring account use is by the proper account holder, thus allowing for the detection of stolen or other type of fraudulent bank account information use at the moment of actual activation. To date, as noted above, the possible options have been deficient or too complicated to establish as a suitable means for this purpose, particularly on a large-scale, widespread basis. A development that permits ease in not only implementation but utilization, coupled with complete (if not substantial) reliability that any such account transaction is authorized, would be highly desired within the industry from the financial as well as the consumer standpoint.

SUMMARY AND ADVANTAGES OF THE INVENTION

The present invention pertains to a novel method of providing direct communication verifications of a person's identity and ultimately their desire to achieve a requested financial account transaction result in a reliable fashion. The overall system depends on a string variable method that accords a limited number of representations to all the words and numbers of a specific human language in order to provide a suitable machine language translation for specific contact point identifications. The system then allows for electronic communications to be undertaken that request a response from a predetermined contact point group (of any population size) that meet a base criteria (in this situation, association with the identity of an account holder). With the response from the address to which the communication is sent, the responder can be properly verified through the string variable algorithm that ensures the identification of the person (or other entity) responding in such a fashion is reliable. Thus, the string variable system permits the only needed capability to determine, in conjunction with the responder's verification contact points (such as cell phone number, IP address, and email address, at least), that each responder actually meets the initial communication request criteria required for authorization for a transaction to proceed. In this manner, as outlined below, such an algorithm allows for reliable and verified communications to occur under any type of prescribed protocol to ensure specific communications, responses, requests, etc., are made from and to required contact points in an instantaneous manner. With this background in place, there is provided, as described in greater detail below, an entire system allowing for the elimination of financial account (for instance, checking account, retirement account, savings account, investment account, credit card account, debit card account, and the like) fraud through the capability of allowing for reliable prescribed contact point communications such that the underlying system verifies the authenticity of the individual or other entity initiating a financial transaction with a specific financial account, thus allowing for instantaneous response to and between the backing financial institution and the merchant (or other entity) permitting the authorization to further the transaction at that moment.

The inventive system is advantageous in that it provides a remote wireless contact point for communication between a financial account provider (or like entity) and an account holder that automatically recognizes that person and his or her account upon use within a transaction. With such a degree of reliability permitted through a simple connection between account holder and account provider, many other advantages are present as a result, including the capability of determining verification of the account holder automatically upon actual transaction initiation. As well, the system provides the advantage to send automatic communications through a wireless protocol upon entry of account information into a transactional system to the account holder allowing responses upon communication (including just a simple log-in to the system through an email, text, call, and the like) from an account holder, contact point, etc., indicating any problems, as well as any requests for other types of actions, all through SMS messages. The system also permits other communications through email, text, phone call, etc. (including SMS, if desired), for other types of requests, if the user needs to provide such notifications, etc. As noted above, such a system advantageously allows for an account holder to directly and instantaneously receive verification notifications from the algorithm system with such verifications supplied based upon his or her profile criteria generated within a prior set-up between the account holder (user), financial institution, and the algorithm system, with the capability of the account holder and/or financial institution to modify verification contact criteria within such profiles subsequent to such an initial set-up. Additionally, as alluded to above, the inventive system may be operated through any electronic media resource, including texting, calling, emailing, etc., via phone technology, including, without limitation, VoIP, and even through an HTML log-in program on a computer (tablet, desk top, laptop, etc.), such as for primarily on-line shopping and other financial transfer operations, without losing any degree of capability in terms of reliable recognition of the entities involved (account holder, financial institution, merchant, etc.) through a simple request and reply communication action. Still another advantage of the inventive method is the efficient manner of rapid reply to a request through the inventive algorithm that reduces account holder identity, information, and other considerations, as well as financial institution, identity, verification requests, and transaction location, etc., to a machine language translation to permit such low-bandwidth communications for such a reliable, straightforward account holder verification purpose.

Thus, additionally, the inventive system provides the overall advantage of such an instantaneous verification system without the need for actual reply from an account (card) holder to achieve the necessary level of reliability for all parties involved to consider the transaction legitimate, through some type of acceptable response from the account holder (such as through an automatic email reply, for example). Another advantage is that beyond the initial set-up between the card holder and the financial institution, and then the financial institution and the algorithm system that undertakes the verification activities, and lastly, the algorithm system and the financial institution and the account holder, there is no need for the disclosure of any information to any other entities regarding the card holder's identity or other information. Yet another advantage is the capability of allowing for such an algorithm system to safely and securely not only communicate such verification processes to the entities involved, but such a system also permits adjustment and/or setting of different levels of verification protections such that specific criteria may trigger extra communication requirements to larger numbers of contact points, etc., in order to allow for reliability regardless of the transaction involved. Still another advantage of this system is the ability of the algorithm system to permit the account holder (user) to set up automatic replies from his or her required contact point(s) to meet the necessary profile considerations for transaction legitimacy, particular if such an expected shopping exercise includes certain purchasing amounts that exceed a threshold level. Thus, as another advantage, the inventive system provides great versatility and quickness for a whole range of shopping, etc., benefits, while primarily serving the entities involved within a secure network to provide the base reliable protocol of verifying identity without any invasive actions or other type of interruptions, all in at least a nearly instantaneous timeframe.

Accordingly, this invention encompasses a computerized method for substantially eliminating financial account fraud or theft, said method including the utilization of electronic communication devices by a financial institution, a financial account holder, and, optionally, a third party, said method comprising the steps of:

1) initiating a protocol between said financial institution and said financial account holder through an intermediary algorithm system in relation to a financial account held by said financial account holder and serviced by said financial institution, wherein said protocol includes the generation of a financial account holder profile and a financial institution profile within said intermediary algorithm system, wherein said financial account holder profile and said financial institution profile both include a client number generated in relation to the identity of said financial account holder, as well as verification contact point requirements to be undertaken by said intermediary algorithm system upon utilization of said financial account within a transaction, and wherein said financial account holder's account information is not shared with or otherwise stored within said intermediary algorithm system;

2) establishing specific contact point identifications with said intermediary algorithm system through an initial communication with each required verification contact point within both profiles of said financial account holder and said financial institution, wherein each of said specific contact point identifications are defined by unique string variables generated by said intermediary algorithm system;

3) initiating a financial transaction by said financial account holder to transfer funds to or from said financial institution in relation to said financial account holder's account;

4) requesting verification of the identity of said financial account holder by said financial institution through communication with said intermediary algorithm system prior to completion of said financial transaction;

5) undertaking communication between said intermediary algorithm system and the required verification contact points associated with said financial account holder and said financial institution such that substantially instantaneous determination of verification is accomplished through the reception of proper signals from said verification contact points by said intermediary algorithm system in response to requests sent from said system to each of said required verification contact points for that specific transaction, such that if the proper signals from all such required contact points are received then said intermediary algorithm system determines the financial account holder is authentic for such a transaction and if any signals are determined improper, then said intermediary algorithm system determines said financial account holder is not authentic for such a transaction; and 6) transferring the results of step "5" from said intermediary algorithm system to each of said financial account holder, said financial institution, and said optional third party;

wherein said intermediary algorithm system provides verification notifications and responses to all parties without any required human interaction;

wherein said results transfer step of "6" is undertaken without the need for any input or disclosure of any personal information of said financial account holder to said financial institution and/or said optional third party; and wherein said method is undertaken through the utilization of at least one computer program within a non-transitory medium.

The inventive method also encompasses a transaction including transfer of funds from the account holder to a third party (such as, again, as merely examples, a merchant, a retail establishment, another financial institution, another entity other than the account holder, another account at the same financial institution, etc.). In that manner, then, the above method would also include the further step wherein said intermediary algorithm system communicates with said financial institution the results of its verification determination in step "5", wherein if said financial institution receives an authentic financial account holder determination, then said institution, said intermediary algorithm system, or both, will notify said third party of such a result to either allow said transaction to occur, or, if such a determination is determination not to be authentic, then said notification to said third party will reflect that the financial account holder is not verified for such a transaction, and, wherein, optionally, such verification determination is further conveyed to all required contact points required within the profile of said financial account holder.

For this inventive financial account protection method, the term "financial account" or "account" is intended to pertain to any account in place and set up by an individual or corporate entity (including partnerships, limited liability companies, corporations, and the like, without limitation) and a financial institution to allow for holding of funds on the individual or corporate entity's behalf, whether in terms of fungible assets or credit assets, including trust property, monetary property, real property, chattel property, and the like, without limitation, and permitting withdrawal and/or transfer thereof such funds from the account to another party. Thus, such a "financial account" or "account" is intended to encompass any checking account, savings account, credit card account, debit card account, investment account (including certificates of deposit, trusts, and the like), retirement account (including individual retirement accounts, 401(k) workplace accounts, and the like), and any other type of account as described above that includes the capability to transact financial activity through any electronic transfer means, in-person means, and the like. Thus, the term "financial institution" is intended to encompass a bank, credit card company, creditor, or any other entity that allows for funds deposits and withdrawals as described above, particularly through electronic media usage.

The term "computer program" or other like description is intended to denote that the overall method is controlled by software code and through the utilization of a computer machine (or the like) for implementation and utilization. The present invention may be implemented on a program or code that can be stored in a computer-readable (or electronically-readable) medium and that can be provided in a WAN environment. The overall system may be implemented onto a server using, as non-limiting examples, Apache web server, MySql on Linux, Oracle on Linux, Java servlets, Applets, HTML, JavaScript, Java, C#, and Microsoft's .NET, in such a manner as an account holder or account provider would have access thereto on demand through a secure connection. Such a server may reflect implementation on the Internet, an intranet, or an extranet. Any software platform may thus be employed to implement the underlying algorithm system, such as JAVA, Linux, and the like, and the code itself may be written in any language, including, BASIC, COBOL, C+, C++, and the like.

The term "intermediary algorithm system" (or just "algorithm system") within this disclosure is intended to encompass the incorporation of a computer program as a conduit between the account holder, the financial institution, and any third party to a transaction between the account holder and the financial institution that includes the herein described and delineated VARSGR algorithm. Such a conduit thus serves as an information storage and operation source that further assigns string variables to all information inputted (whether during account creation or at a time subsequent thereto) for security purposes and also includes communication capability to generate and send requests electronically to such verification contact points, the account holder, and the financial institution for responses via the same electronic channels. The overall algorithm and the system in which it is employed for this inventive method is described in greater detail herein.

The inventive system thus includes the utilization of a string variable algorithm (Variable Assigning Request String Generator and Receiver Algorithm, or VARSGR, for short) to translate human language into machine language with the capability of applying unique characteristics (in this situation, variable strings) to each entity involved in the overall protocol (account holder, financial institution, contact point individuals, etc.) in relation to specific signals, etc., generated from each entity's electronic media source to provide sufficient information for the system to reliably recognize the identity of the entities involved from the receipt of an access communication from such an electronic source alone. Furthermore, the system includes the capability of such account holders to modify the protocol set up for such fraud elimination purposes to also allow for varying levels of protection through changing the number and type of contact points as deemed necessary and/or desirable in relation to specific types of transactions. Additionally, the system allows for the account holder (user) to also adjust his or her capabilities for responding to an algorithm (VARSGR) request during a planned shopping experience (or experiences) by automating the algorithm system response from some of the contact points provided within his or her (or its) profile within different levels needed for verification purposes in such specific instances. As well, the system can permit the financial institution to further allow for offers, ads, etc., from merchants (competitive with typical destinations of the account holder, as one example, as a possibility) to be provided the account holder (user) during certain shopping outings without any disclosure of identity, etc., to such merchant entities.

More succinctly, the invention encompasses a computerized financial account fraud elimination system utilizing electronic media sources for communication between an account holder and his, her, or its financial institution, and, optionally, a third party (such as a merchant, other financial institution, other individual, other account at the same financial institution, and the like) to which funds may be transferred during a financial transaction between the two primary entities (and thus, a retail transaction in person or on-line, transfer of funds from one financial institution to another, transfer of funds from one entity to another, transfer of funds from one financial account holder account to another account of the same entity at the same financial institution, etc.). Certainly, when a purchase or other transaction is undertaken with such a third party, the involvement thereof such an entity is necessary. In any event, the base (intermediary) algorithm system includes the initial creation of a financial account holder profile as well as a financial institution profile in relation to a specific financial account. Upon financial account creation or subsequent thereto, as the case may be, each account party (account holder and financial institution) inputs profile information to allow for the intermediary algorithm system to distinguish the account itself in relation to each party's identifications. Thus, a specific client number (or like assigned label) to provide specific identification of the account and the parties involved is generated such that the account information itself (such as account number, balance information, account holder name, account holder address, etc.) is not transferred to the intermediary algorithm system, but the inputted information is sufficient for full identification to be permitted for both account parties. The profiles thus also include verification contact point identifications for the intermediary algorithm system to access electronically at the moment of profile creation in order to generate specific string variables in association with all such contact points. In essence, the algorithm system contacts each contact point electronically with a request for specific verification thereof; upon receipt of such initial verification of identity, and, as well, confirmation from the account holder directly that all such requests are proper, the algorithm system institutes the necessary string variables associated with each verification contact point required within each profile for a specific account. Once the algorithm system institutes these variables the contact points are indelibly identified within the context of the algorithm system and the string variables cannot be modified without re-establishing the profiles themselves through an entirely new account. In other words, once the contact points are set in terms of string variable identifications within the algorithm system, they cannot be altered without knowledge of both the financial account holder and the financial institution. In effect, however, as alluded to above, such modifications will generally not be necessary. Thus, the string variables associated with specific verification contact points within both the account holder and account servicer (e.g., financial institution) profiles provide the necessary verification capabilities upon establishment of the string variables associated therewith by the intermediary algorithm system. As such, the algorithm system is thus tied to specific electronic media sources (again, such as cell phone, email, text, and the like) that are utilized to not only set up the string variables for each required contact point associated with the account holder and financial institution for the subject account (as noted above), but also to effectuate the necessary verification requests and responses thereto upon any attempt at a financial transaction involving the subject account. Thus, since each string variable is unique and is never duplicated, allowing for individualized identifications for each and every contact point for not only a specific financial account, but for every such verification method protocol created for all such financial accounts handled by that specific financial institution. In this manner, the algorithm system not only ensures every contact point associated with a specific financial account is unique and verifiable simply through the initiation and activation of the aforementioned individualized profiles created for each account (for both the account holder and the financial institution in a separate manner), but that each contact point in total over the entirety of all such accounts are distinct and verifiable for accuracy and reliability, as well. As described herein, the inventive system, once the necessary profiles are in place, automatically recognizes the identity of the subject account holder and any and all other required verification contact points associated with a specific transaction involving that financial account. This overall method is unique and heretofore unheard of within the context of financial account identification protections. As such, this is assuredly not a broad abstract idea, but a definitive process that requires specific method steps that have no past basis within this field.

Thus, within the context of this overall method, the term "proper signals" as it applies to communication between the intermediary algorithm system and all verification contact point requirements for each transaction within the profiles of both a financial account holder and a financial institution in relation to a specific financial account is intended to reflect receipt of a response from all required verification contact points in reply to a request from the intermediary algorithm system. Such a response may be provided with an automatic reply (such as through an email, text, or cellphone platform) set-up by the financial account holder specifically in anticipation of such a transaction. Additionally, a response through a specific reply code from, for example, the account holder's immediate communication device (e.g., in his or her possession at that moment) coupled with an automatic or other type of set reply from any required verification contact point would be considered "proper" in this context since, as above, it is evident that the account holder has specifically arranged for such a reply with the expectation that he or she is undertaking a financial transaction in this respect. If the account holder misplaces or has stolen an account number, account card, and the like, then all that is necessary to prevent a "proper signal" receipt by the intermediary algorithm system if such information is utilized in a financial transaction attempt is turning off an automatic reply, responding with a specific indication that the situation is "improper" (which can be read by the algorithm system as "improper" in that context), or even turning off or otherwise refusing a reply from any required verification contact point for that specific type of transaction. Because the algorithm system has instituted string variables for each required verification contact point, any attempt to alter the source of a reply to a system verification request would be easily and suitably interpreted by the algorithm system as an "improper signal" since the request and response must be sent to and received from the same source indicated by a non-duplicated, unique string variable. Likewise, if an account holder has his or her phone stolen, an additional required verification contact point (or more than one, for that matter) may still be employed for overall verification purposes. If only one reply out of at least two in response to an algorithm system request is considered true in relation to the requirements for contact for authentication purposes in relation to a specific transaction, then the signals would be considered "improper" and the transaction would be refused. Thus, if all requests and responses in this context are considered trustworthy, only then would the system consider such communications as "proper signals" and allow the transaction to proceed; if even one required verification contact point is deemed untrustworthy in this manner, then the system would consider such communications as "improper signals" and the transaction would be terminated. Such a situation applies to the verification contact point requirements set for each transaction within a subject financial institution's profile, as well. Furthermore, if the verification contact points of the account holder or financial institution receive any requests from the algorithm system that are clearly improper (for instance, if the account holder is not involved in a financial transaction at the time a request is sent, or if the intermediary algorithm system profiles for each entity are set in a specific manner for a dormant account that is now being accessed, as examples), then either holder or institution may generate an overriding response to the system (such as, for instance, typing "NO" or "FRAUD" or like message) in reply as an authoritative demand for action to be undertaken at that moment. Although human interaction is thus not a requirement for verification contact points to send replies to the intermediary algorithm system, these types of exceptions and allowances are certainly possible, if desired and deemed necessary.

Hence, the invention further encompasses a procedure to undertake such a fraud elimination protocol in relation to an intermediary algorithm system to communicate between all entities involved within a financial transaction, and includes the more specific steps of:

1) during such profile set-up, said financial account holder provides contact point signal identifications to said financial institution issuing said account;

2) said financial account holder and/or said financial institution indicates the number and level of identity verification points needed per account transaction subsequent to protocol set-up within said intermediary algorithm system;

3) subsequent to such profile set-up and intermediary algorithm system activation, said financial account holder (or a proxy thereof) swipes or otherwise transfers account information to a third party (merchant) device and, optionally, provides a PIN, etc. (as is commonly undertaken with purchases point-of-sale), thereby activating a communication with said financial institution of such an action involving the subject account;

4) said intermediary algorithm system then receives a notification of such a transaction initiation from said financial institution and determines the specific verification contact points requiring communication with regard to the specific transaction in relation to the profile information of both said account holder and said financial institution;

5) said intermediary algorithm system then sends an electronic communication request to each such verification contact point seeking a reply thereto;

6) the financial account holder's established contact point(s) then reply to said electronic communication request (such as through a text or email and/or through an HTML platform, as examples) in order to verify identity and intent to complete the transaction, wherein said account holder is not required to respond to any requests from said intermediary algorithm system;

7) said algorithm system receives such reply or replies from said verification contact points allowing for the ability to verify such points are associated with said account holder for this purpose;

8) after verification of identity through as many verification points as defined by said account holder and said financial institution, said intermediary algorithm system sends a notification via any electronic media to said financial institution indicating verification has been shown or not;

wherein the account holder (or the financial institution or both) may opt to exercise auto reply in a standard email or text format for such a response to an algorithm system request, particularly if there are multiple verification contact points required for a specific transaction (and that require substantial simultaneous reply for verification to be accomplished within the algorithm system), such that all such communications may be undertaken with the same electronic communication pathway or through any acceptable different pathway (such as all communications may be undertaken through as SMS protocol, in order to reduce bandwidth requirements or even in order to expedite purchasing processes when an account holder or its proxy has a definitive shopping plan, for instance, or the system communication may be through SMS and a reply may be through a larger bandwidth platform);

wherein the overall system allows for separate requests from or to an account holder or its proxy (using again an HTML platform and/or SMS messaging, as examples) regarding information about goods and/or services sought and/or offered between a buyer and a seller before first verification of identity and intent for completion of a transaction (ostensibly to allow for, at least, greater capability to order and/or direct advertisements and the like to specific persons dependent upon specific interests); and wherein any attempted transaction without authorization within the defined timetable will cause system notification of any and all parties (and optionally, and potentially preferably, all required contact points) requiring such information including but not limited to user (account holder), financial institution and merchant through any and all contact points and media available.

In general terms, then, the overall system thus depends on the implementation and utilization of the following algorithm, as presented in the following sequential steps:

1) Creation of offered subject matter (in this instance, verification contact points associated with a specific financial account holder and financial institution for reliable transaction capabilities) followed by a search of a properly parsed database for individuals or personnel that meet the criteria associated with such subject matter as determined through the adoption of the string variable system (in other words, upon determination and disclosure of necessary verification contact points and identification information, said algorithm system will search for all such required signals/individuals/etc. within the necessary and/or supplied population database for pre-verification purposes);

2) The database then matches the string determining such a population and the IP addresses of a set population of the persons (or more succinctly, the required verification contact points) that meet such criteria (as set within the financial account profiles described above); the search stops when the string is finished through verification that those selected match all pre-determined criteria;

3) The database then sends communications to those people and only those people that the meet criteria for the subject matter involved (whatever is being offered); such a step is accomplished through string variables attached with human language (or machine language, if human interaction is unnecessary);

4) Those that receive communications in this manner then must respond with the text or email (anything else electronically) that they received; correlated machine language has to be in the response (through the string variable) and such a response must be sent from the address at which the person received it;

5) The system then matches all machine language subject matter returns (and thus all that include the string variable) from sent-to IP addresses from the group of persons that met the criteria pulls identities from the group to the string variables (with a finite count of possible persons to be selected in this manner);

6) When the matches are then made, the IP address and the profile including the embedded contact point(s) is pulled through the string variable as indications that the selected people wanted this result;

7) The system then responds with a confirmation that the person's (verified contact point, in this instance) desired result has been granted and then updates the database to remember the result and then not attempt to accomplish it again;

8) The person's (persons') profiles that meet the criteria and respond are then kept within the algorithm system as proper contact points with their verified signals in place.

Within the overall bank account protection method described herein, the algorithm system is implemented to provide the necessary communication conduit as well as verification determination component to allow for an entirely automated process to be undertaken. Thus, upon creation of a financial institution profile within the algorithm system in relation to a specific account (and thus account holder; or, multiple accounts for a single account holder), the algorithm system will generate a specific string to bridge both entities together based upon random variables that become set for that specific purpose. As well, once an account holder creates his or her or its profile in relation to an account (or accounts), a different string is generated that relates to the string for the specific financial institution for that specific account (or accounts). Once the profiles are then created, and verification contact points are specified by both the account holder and the financial institution (and are kept separate and unknown by the other entity), the algorithm system then creates a string for each such contact point that initially sets the variables associated with each contact point that cannot be altered. Any other contact points added later by either entity will also be assigned a string variable in a like manner. Thus, once these strings are generated and incorporated within each profile, the account holder or financial institution may set any requirements as to actual communication with any number, sequence, etc., contact point to ensure algorithm system requests will be sent to such necessary addresses (email, text, phone, etc.). Since each contact point has its own string, any deviation from that specific identification string (such as a different phone number, a different email address to which an initial request has been forwarded, as merely examples) will result in a determination of an improper contact point. Likewise, if the response generated to the algorithm system request does not correlate to the set string for such a required contact point, then verification fails and the transaction is not allowed to proceed. As noted below, the sheer number of available string variables allows for specific contact point identifications in such an exact manner that there is no feasible way to break such a protective combination. The same potential resides with the profile for the financial institution, with the added capability of actually having the string variables (in table form) for each necessary verification contact point continuously rotated, reversed, switched, etc., in order to add a further level of security.

In this manner, with the algorithm system thus harvesting and having ready for communication purposes the required verification contact points associated with a specific bank account holder/financial institution's set protocol for fraud elimination purposes, this system can thus be utilized for the following issues, as well:

1. The scalability of the fraud elimination system for any number of merchants and anywhere within a determined geographic region;

2. Overcoming slow confirmation to responses from media formats that require human review and intervention, thus providing a nearly instantaneous capability to any verification requests through the string variable format involved;

3. True verification of marketing effectiveness provided via existing search engines;

4. Providing a suitable and reliable platform where a buyer's contact information is not disclosed to a seller while allowing communication between parties;

5. Complete integration between sellers, advertisers, buyers, shipping services, inventory control, and manufacturing for multiple industries;

6. Use of sellers' resources and the ability to track and acquire new requests for goods and services without the buyer's personal information; and 7. A system in which buyers can leave requests for goods and services not immediately available for later response notification when requested goods or services become available.

8. A means to authenticate the sought-after transaction itself in order to prevent an account holder from accessing account funds in this manner and then later claim that such an activity was not undertaken (in other words, preventing fraud on the financial institution and third party by proving through the utilization of the intermediary algorithm system that all required verification contact points were communicated with and proper signals were received showing that such a transaction was not only verified from an identification standpoint but since the account holder had control over all contact points for such a purpose that any attempt to deny such a transaction occurred would be easily countered).

As alluded to above, the inventive system provides such extra benefits by creating a string of variables that can be sent and received via multiple electronic media. In addition, the system can provide a variety of other benefits, including, without limitation: monitoring systems for information sent that is attached to responses to an original request while also allowing direct messaging to the system; a user-friendly system for responding to the request by simply replying with no extra typing or input requirement; a platform that all features of the system can be utilized by any mobile device; a system that, upon receiving an algorithm system request, eliminates the need for telephonic communication, positive responses, or any other type of confirmation, only identification of the requested contact point in relation to the account holder for verification; when an account holder shops via a search engine (on-line) company, at least, a platform that can generate a distinctive and separate list for buyers of only paid advertisers found in a search without changing any provided search information; a platform that allows search engine companies to match buyers and sellers (paid advertisers) with immediate available inventory to fill requests, therefore giving buyers immediate multiple options without searching individual websites for inventory; a platform providing sellers (paid advertisers) with multiple requests for inventory from serious buyers (wherein these requests may be responded to manually by seller or by automated inventory system providing response to verify the items availability); for any unfulfilled buyer's request, a system in which buyer's request remains open so that the request can be filled automatically once a suitable item is available; a platform that provides sellers (paid advertisers) information pertaining to any such unfulfilled request of a buyer for items not immediately available, therefore initiating an order for additional inventory to fulfill such a request (with the automatic notification to a buyer of the availability of items and verifies buyer's continued interest in a purchase by sending a confirmation to both a seller, such as a paid advertiser, and a buyer); a platform for buyers to leave a request with multiple sellers (paid advertisers) for items not immediately available without divulging personal information for a notification of item availability; a platform providing notifications to search engine companies when a buyer purchases a requested item from their client (paid advertisers) (which effectively allows search engine companies to prove their value for every purchase generated by such a search engine company); a system that permits a buyer to obtain confirmation of an available item and seller's information through all forms of electronic media therefore enhancing mobility; and a platform through which a buyer may cancel a request for purchase which eliminates the confirmation sent to a seller (paid advertiser), thereby releasing such an item to available inventory. Basically, the overall inventive system utilizing the algorithm system accords a user (financial account holder) incredible flexibility and ability to enhance a shopping experience in any retail format (on-line, in-person, etc.) all with the reliability for all parties involved (account holder, financial institution, and merchant, at least) that the retail or other like transaction utilizing a bank account is verified and valid.

DESCRIPTION OF THE INVENTION

As noted above, the key to the overall effectiveness of the fraud elimination protocol is the utilization of the VARSGR algorithm. This string variable algorithm allows for the reliable connection between account holder, financial institution, merchant (or other third party), and verification contact points, at whatever level and/or number required for such purposes. The other items discussed above (enhanced shopping experiences, available advertisement and commercial offerings in a targeted manner to the specific, non-disclosed card holder, etc.) are also possible through the utilization of this algorithm as the identity of the card holder is easily confirmed within the system in relation to specific machine language related to the string variables implemented therein. Such string variables allow for an inordinately high number of variations of identification possibilities in relation thereto, thereby allowing the system to not only easily distinguish one account holder from another, as well as one contact point from another, through a simple text or email (since the initial confirmation of identity directs the system to apply string variables to each individual card holder, contact point, etc., that are then related specifically to those persons, contacts, etc., alone).

The algorithm itself, as noted previously, is referred herein as variable assigning request string generator and receiver. In greater summation from above, this algorithm is provided in a manner in which all searchable criteria are assigned a variable using the letters of the alphabet and the numbers 1-9 to create a string of variables that can be sent via any electronic media which may include but is not limited to SMS or email. These texts or emails can include other information. This information may be viewed, read, or acquired by either human or digital systems to solicit a positive or negative response. These responses are differentiated in the fact that a positive response is viewed as a reply to a request via any electronic media including but not limited to SMS or email. The account holder, contact point, etc., responses are then received by the algorithm and evaluated for authenticity by verifying account holder, contact point, etc., identities through matching the string (request) (which is time-stamped upon generation by the algorithm system variables) sent to a verification contact point email address, IP address, and/or cell phone number with the email address, IP address, and/or cell phone number from which the necessary response to the string is received. With the string variables in place and associated with each original or modified verified contact point, any lack of matching of string variables at a later time would indicate the contact point is not authentic and a fraudulent activity is taking place.

If the account holder, contact point, etc., response is found to be valid, the algorithm then matches each string variable to the system search denoted by each variable to evaluate that a matching request is still available and that the account holder, contact point, etc., still meets all requirements of the sent request. As well, although such a system is designed to act substantially instantaneously, in actuality, it will hold the overall instance or transaction open until the required number of responses with strings is achieved after the algorithm system sends its initial requests (or until the system is effectively timed out without having received a response from every required verification contact point). If a matching request is still available, the algorithm sends confirmation to any and all known addresses of an account holder, contact point, etc., responder through all available electronic media that such a response was accepted and updates any and all databases used by the algorithm system. The database in this situation is the aforementioned intermediary algorithm system acting as, basically, liaison between the account holder, financial institution, and merchant (or other third party, as described above, including another financial institution, such as a transfer from one account to another, or from one account holder to another as a payment, transfer, or other like situation, as non-limiting examples) (for each transaction, at least). The matched contact point, account holder, etc., response is then archived within the algorithm system for further verification purposes. If a contact point is changed by the account holder or financial institution for any transaction, then proper notification is also provided both entities, both to ensure such requirements will be understood and further properly handled in the future, as well as to alert all involved that such a modification has been applied. If the modification has not been requested, the algorithm system can thus be properly alerted itself and such a change can be prevented.

Upon initiation of a financial transaction utilizing the account of the holder, the algorithm seeks all required contact points through the electronic media available and required in association with the profile of the financial institution and/or account holder; if all contact points are verified through the algorithm, then the system communicates such a result to the financial institution and awaits the request to inform the merchant (or other third party). If all contact points required are not properly verified, then such a result is conveyed to the financial institution for handling in that respect, as well. The capability of the overall system is that the algorithm may be utilized to dial in a specific "lock" mechanism for any type of transaction in relation to the verified contact point number and type. With the string variable configuration, this algorithm can thus provide 1,679,616 different assignable variables for each definable search criteria entry by utilizing the upper case alphabet and the numbers 1-9 in combination of 4 characters, as one example. Although probably unnecessary, the algorithm has the capability, as well, to incorporate lower case alphabet characters which would increase the assignable variables per 4 character combinations to 14,776,336, and even further if larger character combinations or even other symbols (Greek letters, graphic symbols, such as &, *, and the like, as, again, merely examples) are employed. Basically, the capability of the algorithm system to apply string variables for identification purposes is, ostensibly, infinite, with the only real limitations based upon human and/or hardware capabilities. As such, the scalability of this overall algorithm system is, again, potentially infinite as the combinations available for contact point purposes are truly astronomic in number. Thus, the capability of adjusting any profile verification requirements may be made as many times as desired or required by the account holder and/or financial institution in order to ensure that repetition of the overall contact point requirement protocol will not result in fraudulent card activity due to hacking or other type of improper action. Furthermore, the financial institution may also choose to undertake a simple reversion of the pertinent profile string variable tables thereby changing the string variable request(s) sent without changing any functionality or view seen by the account holder, and, perhaps more importantly, without any need to undertake programming changes within the software code. In this manner, the security levels may be increased exponentially without any functionality, programming, or format change, and at the financial institution level, thus preventing any definitive hacking capabilities since the account holder will have his, her, or its own standards in place that may or may not be accessible by the financial institution. The lack of crossover in terms of requirements set for algorithm verification contact points for any account, or even as low on the pyramid as a specific type of transaction within any account, thus allows for even greater levels of security with a (substantially) instantaneous verification system.

Additionally, to further show the benefits and highly unexpected value of this inventive algorithm, multiple search criteria are placed in the request producing the string variable. To ensure this system will allow for utilization with even the oldest SMS platform, the string variable has been limited to a maximum of 23 separate classifications of definable criteria for matching string variable with database information. These oldest available SMS platforms have 142 character limitations. The reason the 23 separate classifications of definable criteria is not the product of 142 divided by 4 is that the system uses specific symbols to locate the beginning and ending of the string variable and breaks are denoted with other specific symbols between variables. Again, these combinations can be scaled to any number, dependent upon the selected levels of variable capabilities defined by the hardware employed or human element involved. Thus, again, the numbers provided above are non-limiting examples of the effectiveness and capability of the algorithm system described herein.

The number of classifications needed and the priority of each classification is dictated by the database algorithm pertaining to setting priority of search classifications such as, for instance, considerations such as color, date, common name given to item, and any other criteria that database operator wishes to use to filter for a particular item or service (here, for instance, in relation to providing required verification contact points to ensure a financial account transaction is true). It is the matching of these generated string variables to the account holder's/contact point's variable assigned that allows the system to move under one instance therefore allowing requests for verification purposes and allowing full functionality of the underlying system.

Thus, the inventive system solves the noted typical financial account fraud elimination method deficiencies by creating a string of variables that can be sent and received via multiple electronic media. Such a medium is preferably a cell phone (of any type that allows for texting, emailing, or other type of textual communication), for obvious reasons. Additionally, the system may function properly through a user's computer, whether embedded within a laptop, tablet, desk top, or other large type, platform. Additionally, any wireless system that provides communication capability of the voice, text, email, etc., variety, such as a wrist-placed device, eyeglass device, and the like, may be utilized in this manner, too. The variables are assigned in relation to a request sent to an account holder, contact point, etc., over such a medium and upon confirmation of identity by verifying the contact point from which the response with strings came from is the actual contact point to which a request with strings was sent.

The system may be further implemented through the utilization of suitable readable screens incorporating requests, transaction details, transaction confirmations, request acceptances, transaction cancellations, etc., whatever communications are undertaken over such a medium for this purpose. These are provided below as merely non-limiting examples of possible screens including such information. The simplicity and effectiveness of the overall system is evident and is permitted through the above-described algorithm. Without the string variable capabilities, human interaction and involvement would be paramount to guarantee each request and procedural step is implemented properly and for the correct account holder and/or financial institution. The ability to relate the other considerations to this initial system provides highly effective extra benefits that make the overall system that much more attractive, particularly in terms of an all-in-one process that eliminates the need for workforce involvement beyond the potential for emergency calls due to unexpected system shutdown.

Thus, the VARSGR system basically creates a string of variables recognized by the system as defined through a platform (protocol) setup such as point-of-sale location, store name, number of certification points (verified contact points), and assigned letters or numbers to replace actual bank account numbers for enhanced security (the only defined information are contact points; all other pieces of information are replaced by variables that can be set permanently or modified at any time). The protocol, as noted above, allows for the creation and input of user (account holder) profiles in association with the target bank account (such as a checking account or any other defined account for which a transaction should require verification of identity of account holder in a timely fashion) held by an issuing bank (financial institution) including any and all contact points and defined levels of contact points. The bank account may actually include multiple sub-accounts such that a primary account number (or other type of identification measure that correlates a person, group, or other entity to an account or multiple accounts) is associated with a checking account, savings account, debit card account, credit card account, investment account, retirement account, etc., that may be governed through an umbrella profile with sub-profiles that require individualized specific verification contact point protocols as described and defined herein. It is certainly possible, and expected, that an individual or corporate account holder may have multiple profiles with different levels and contact points, as well. These profiles, as discussed above, may actually be turned on and off and prioritized in order, as prescribed by the account holder and/or financial institution, and modified in whatever manner desired, to actually exponentially increase security for each account.

One major component in the operation of the VARSGR algorithm system is that the string is sent to profiles which meet all search criteria so that only those users listed in the subject account holder profile associated with a specific account receive information. The system certifies that the contact point to which the string is sent is the same contact point from which a response is received. Without this guarantee, the overall system would most likely fail. The enhanced security provided through the string variable capability in this manner, particularly without any need for human interaction, has heretofore been unexplored within the bank account fraud elimination area.

As such, the system then matches the strings together for the verified contact points contacted thereby. Once the number of each response level is then achieved (which should be nearly instantaneous, up to about 20 seconds in duration, preferably within 10 seconds, more preferably up to 6 seconds, as merely examples; as noted, such requests to and responses from verification contact points should take less than one second to complete such verifications, thus providing a proper description of the term "substantially instantaneous"), the VARSGR system then sends a message of such a result to the account holder (user) and allows the transaction to proceed (as well, communication with the financial institution and, ultimately, the merchant involved, may also be implemented in this manner and for this purpose). This string variable thus verifies the true identity of those responding to such requests for responses without the need to request or divulge any personal information in the process. For corporate customers, the individual responding is identified since there may be more than one individual who can authorize a transaction. If, for example, a string is sent from a contact point to which the system did not initially send a string, the system identifies this as fraud and notifies the institution, user, and any entities needing such information of fraud attempt.

The security of the string variable algorithm system is such that messages cannot be intercepted and/or forwarded. Basically, the action of matching the strings from the point of response to the contact point to which the string was sent precludes any such interruptions, particularly as the speed of such signal transmissions are much too fast for any other actions to commence in that respect.

As also noted previously, since the variable string may contain other transaction information, such a device may also be utilized to send to different notifications, etc., to preferred merchants for electronic verification of stock and special offering of goods and services at discounted rates to the user. Such offerings would be sent via all media to all contact points, again relying upon the effectiveness and reliability of the string variable, itself.

In effect, the system itself can also permit the account holder to receive readable data sent by the string through a notification request of an attempted transaction in order to make his or her decision to verify the transaction including but not limited to amount, date, time, and name of merchant. In addition, the readable data accorded the account holder (user) may be limited to a series of numbers, symbols, and letters that can only be fully recognized by the system. In such a situation, however, the system would merely require the user send this string of variables back to the contact point from which it was sent to provide the verifications necessary. This may be accomplished by forwarding or replying to the transaction request, making the overall system very simple to actually utilize in this respect. The only requirement, important and necessary as it is, is that the response must be sent from the contact point at which it was initially received. This allows the user to avoid any need to certify a transaction with a pass code input. As well, it eliminates the ability to intercept the string and send a response from a false contact point, thus preventing any improper actions in that manner. Additionally, the system permits the utilization of auto-reply email to permit the aforementioned and described planned shopping outings, thereby permitting increased speed of transaction verifications at point of sale (no need to log into a system, need to submit detailed information, etc., of planned shopping, since the string variable recognizes the contact point automatically). This also eliminates the need for a user to provide any personal information regarding identity, activities, etc., including a planned shopping location. Furthermore, this capability also allows for multiple active contact points in effect at all times increasing the potential for transactions to proceed at planned shopping times and locations.

In addition, the string variable accords the account holder further flexibility by permitting the utilization of profiles with different levels at the same time. As alluded to above, such a potential situation allows for set profiles (or modified, as the case may be) to include certain response criteria, rather than all standard types for all types of transactions. Thus, the system may be required to communicate with specific contact points through specific email addresses or cell numbers for certain transaction types, not to mention the potential necessity for an increase in contact points, as well, all in order to increase security protocols for certain transaction situations.

As an example, an account holder profile may require contact with a cell number and a certain email account for authentication of a transaction involving an amount in excess of 500 dollars. If multiple phone numbers and/or email accounts are required for contact points, and a request for verification shows a reply from an incorrect account, then the system initiates a fraud notification to the parties involved. As well, if someone steals an account holder's or contact point's phone including a necessary email address and breaks or unlocks it, the system accounts for such a possibility. If, for example, the subject phone includes 3 email accounts and all receive the request, but only one is a required contact for verification purposes, then, if the bad actor responds with all 3 accounts, authentication would not be permitted due to this improper reply.

The capability of modifying required verification contact points on demand through activation and/or deactivation of specific profiles associated with an account further increases the security features involved. This is particularly impressive as it may be accomplished without any need for new software or hardware, only a request from a verified account holder in relation to the algorithm system (with a proper verification for such a request to be made to the system). If an account holder or account provider (e.g., financial institution) seeks to modify the necessary contact points within their specific system profile for any type of transaction, either entity may simply send a communication in some electronic manner (text, email, etc.) to make such a change. As noted above, any such modification will elicit an algorithm system communication to all profile verification contact points to ensure such an adjustment is desired and proper of the pertinent entity. Additionally, since there may be an unlimited number of profiles associated with each user account, and, furthermore, an unlimited number of levels of security through contact point requirements, at least, for each account, as noted above, the system itself is basically infinite in scalability for such security purposes. Thus, the string variable algorithm allows each account holder access to what is in effect a potentially ever-changing combination lock with password protected access points, all with the ability to ensure any such changes are monitored for authenticity as well.

This algorithm thus allows for reliability in terms of the identification of the responding person (or persons) solely from the capability of the string variable conversion to determine, in conjunction with the responder's verified contact point, that the characteristics, etc., of the responder actually meet the initially requested criteria. The algorithm thus provides a system to eliminate bank account fraud by offering unlimited numbers of verification points per transaction and opening proprietary buyer-seller portals without divulging identity or contact information of the stated buyer. In addition, through the use of the most efficient means for transfer of desired data from internet searches, bandwidth use is reduced up to 66 times resulting in much greater efficiency (such as through the utilization of SMS for all communications to reduce bandwidth requirements for low-cost operations).

An electronic transaction may be blocked until a multiple of user identification verifications can be met (up to a set time limit, such as, as examples, 1 minute, 45 seconds, 30 seconds, 20 seconds, as low as 10 seconds, if desired) as dictated by transaction criteria that are set within the profile requirements. The number and nature of verification points may be specified by the user or financial institution involved in the transaction. The user must make his or her desired contact points available to the institution involved in the transaction and the number desired per transaction based upon the amount or other definable criteria. In addition, the system has the ability to identify levels and can be set to demand verification from one or more contact points within each level such as companies which require a secondary administrative approval per transaction. These certifications can occur simultaneously, therefore not impeding the timelines of point of sale transactions. The system also allows for multiple accounts to be held by one user. To the contrary, the prior protective measures undertaken in this vein have been shown to have high operating costs, large equipment investment, and/or inconvenient use or infringement upon account holders' privacy.

The overall system is utilized, as well, with any withdrawals from (and even, in some situations, deposits to) an individual or corporate checking, savings, retirement, or other investment account. There may be instances where an account is accessed in an improper manner such that a bad actor may seek to remove available funds (up to the permissible amount) from another's account (as well, a bad actor may seek to deposit funds into a potentially dormant account to hide such ill-begotten assets, with the expectation to withdraw the same at a later date; this system allows for such deposits to be scrutinized, particularly if the typical set-up would not consider the deposit and withdrawal of the same amount of funds suspicious). If such an actor also has access to acceptable identification information (such as a social security number, a false ID, overall base information, such as address, phone number, and the like), then the capability of withdrawing (or depositing) funds from such a hijacked account is increased, too. Basically, the standard methods of stealing account information and identities leaves such types of accounts susceptible to attack in this manner. The overall system thus overcomes these account problem issues through the utilization of the string algorithm. Upon any withdrawal transaction, whether through electronic debit (as above) or even through check, withdrawal slip, telephonic request, etc., the system would include the requirement that any such action must meet the profile requirements instituted by the account holder. If the necessary contact points are not properly contacted by the system and/or do not properly reply to the algorithm system within a set amount of time, then the transaction would either be stopped completely or at least delayed until proper verification in this way has been provided. This allows for a number of improvements within the financial system in general, particularly since such stops could provide suitable alerts not only to the account holder of a possible invasion by an outside party, but also the lack of sufficient funds automatically. This could thus permit a simple low-bandwidth notification system that would prevent overdrafts and loss of actual funds instantaneously. Additionally, in terms of checking accounts, at least, the potential for delays in available funds transfers, either deposit or withdrawal, may be removed with this variable string algorithm system. With substantially instantaneous verification of identity through the request and response procedures set in the profile associated with such an account, situations such as out-of-state checks, $5,000 upper limit instant accessibility for large deposits, etc., may be avoided, thus allowing for better access to funds for all parties involved.

Additionally, the VARSGR algorithm may be employed to prevent any attempts to open improper accounts, too. Basically, banks are overseen, to a certain extent, at least, by an overarching system that allows for communication between such financial institutions in order to determine if certain account holders have other accounts with the same entity (or another bank). Presently, such a system is only in place to detect such other accounts if certain account holder information is inputted within a search field within the controlling database. Thus, if a person's identity is stolen, such as a social security number, full name, address, etc., a bank would not have any means to uncover any bad actor posing as another person in such a situation and the database will only indicate the existence of other accounts, not if such a new sought-after account was authorized by the actual account holder. The VARSGR system can be configured to have the financial institution correlate the presented account holder identity to other accounts and require verification contact points to respond to authorization requests in the same manner as described above for transactions. In this manner, if an impostor tries to open an account, whether a new checking account, credit card account, etc., the algorithm system can detect any problems and prevent such an attempt, again, nearly instantaneously. Thus, if the system seeks a response to a request from a verification contact point that has is its own specific string variable, and either receives no response or a negative response from such a required contact point, the account creation can be stopped and the proper authorities can be notified at that moment to apprehend the bad actor on site. The same capability to notify the police or other officials for such a purpose is clearly a possibility if a transaction is nullified or otherwise denied at a point of sale (such as at a merchant or other retail or restaurant establishment), too.

Through the utilization of the VARSGR algorithm within the above-described bank account protection method, all parties involved, the account holder, the financial institution, and the third party (merchant, other financial institution, other individual, and the like, as examples) are thus accorded the greatest degree of reliability that any transactions undertaken through such a method are verified and proper. If a person's account information, personal information, cards, etc., are stolen, any attempts to transact funds transfers pertaining to such accounts would be easily thwarted as the bad actor would not have the ability to timely and/or appropriately access the required verification contact points for the algorithm system request and response protocol. Thus, even with such account information, including passwords (if included) and other possible verification considerations, the lack of algorithm contact points would prevent any processing of such an initiated illegal transaction. Additionally, any attempt at such information gathering through a phishing operation would not only result in a total block of such a transaction, but any further actions by the same bad actor could be easily uncovered as the system can utilize the variable strings to record any communication platforms from such a criminal source and prevent any further transaction attempts from that specific computer, phone, etc., with the same financial institution. In this manner, with the VARSGR financial account protection algorithm system in effect, stolen account information of any type would be worthless.

Furthermore, the ability to, as noted above, modify the required contact points from either the account holder's or the financial institution's profile in relation to a specific account (or sub-account, as the case may be) in any manner, such a regular adjustment on a daily, weekly, bi-weekly, etc., basis, further complicates and thwarts any invasive attempts. In essence, the capability of assigning specific verification contact points that must be not only in receipt of requests from the algorithm system, but also the source of responses back to the algorithm system for each and every transaction in relation to an account, sub-account, etc., initially provides a nearly impregnable barrier to attack by bad actors. The further ability to modify such required verification contact points on demand provides an even higher level of protection, akin to having continuously adjusting combination locks on either side of a transaction door. Since the account holder sets the combination on demand (with, again, the combination being the required verification contact points that must receive and respond to algorithm system requests) on one side (within the above-described algorithm system account holder profile) and the financial institution sets the combination on the other side (through its own algorithm system profile), any modifications made on either side (which, again, do not affect the requirements of the other side) would easily prevent any attempts to hack into the system itself. Any such invasive hacking would not provide any determinative requirements information, initially, let alone the undertaking of such a possible activity would be not only exhausting, but cost prohibitive. Additionally, even if such a situation were to possibly occur, the algorithm system would not have any financial account information, but hard to decipher language which would be worthless to such a bad actor. Likewise, if the financial information were stolen from a financial institution, any attempt to utilize such information would still require accessing the algorithm system verification contact points to allow for any such transaction. Lastly, if the intermediary algorithm system were shut down, the lack of such activity would automatically prevent any transactional processing. In all scenarios, then, the capability of the VARSGR bank account protection method provides, again, the greatest level of security for financial transactions.

The following shows the implementation of such a system in one manner well beyond a typical financial account (e.g., credit card) fraud elimination protocol.

DESCRIPTION OF THE DRAWINGS AND PREFERRED EMBODIMENTS

Without any intention of limiting the breadth and scope of the overall inventive method, the following descriptions of the accompanying drawings provide one potentially preferred embodiment of the utilization of the aforementioned inventive algorithm as implemented within a credit card fraud elimination process.

Figure 1:
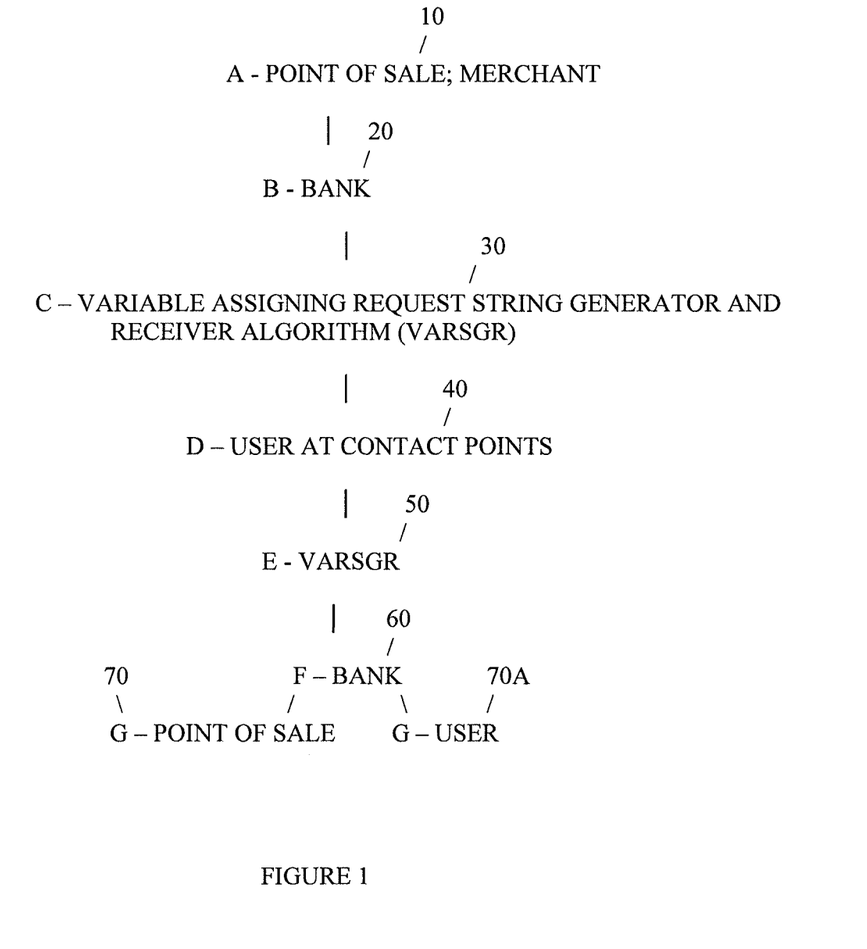
FIG. 1 is a flow chart of one possible embodiment of a potentially preferred bank account fraud prevention method.

FIG. 1 is a flow chart depicting certain method steps to accomplish the desired fraud elimination result. As shown, step A 10 denotes a credit card user swiping or otherwise inputting his or her card information at a point of sale device in some fashion (such as a cash register or extension thereof, thus either by the card holder or by an employee of a retail or other type of establishment). The customer may input a private identification number, ZIP code, or other type of signature (such as electronically signing a screen, as one example), or the system may automatically uncover the expected identity of the account holder through such an initial action. Step B 20 then shows the point of sale system (within the overall computer program implemented within a non-transitory medium) sending a request for transaction to a financial institution (as is typical in these situations). The financial institution then sends an electronic message (through the same computerized format) to the fraud prevention algorithm system (step C 30) effectively requesting that system to approve the transaction to the credit card user (which may include an authorized other user or users, as well) at specific save verification points. The user (or users) then receives such approval requests through multiple electronic media in simultaneous (or as soon thereof) fashion (Step D 40). Such media thus may include, as noted previously, multiple cellular devices, email accounts, or HTML platform accounts (or a single account) that is accessible through a login and password protocol. Step E 50 thus shows the user's (or users') reply from such required communication media devices in order to satisfy the requirements requested by the financial institution. These actual replies may be separated by levels in accordance with multiple different contact points within the user's individual system. As described above, these levels may be provided in such a manner as to permit the user to set up a planned shopping outing that allows for automated response from certain identified contact points within aforementioned specific levels during user's planned shopping agenda thus allowing the financial institution to provide an accelerated transaction approval process for such a specific outing by the user. In essence, this overall step permits the system to automate response from multiple verification levels of large transaction amounts which might generally entail delays (and possible suspicions) at different (and multiple) merchant locations. Step F 60 depicts the response (or responses) provided to the algorithm system from as many different levels as directed by the financial institution to allow for directed verification to occur. Thus, the algorithm system verifies the contact point response sent from each contact point to which a request for response has been sent in reply to the financial institution request. Any responses that arrive from a contact point that is different from or falsified requires notification to the financial institution of attempted fraud. In such a situation, the user him- or her-self may also be notified if the financial institution directs such an action (or, alternatively, if the agreement between user and financial institution requires such an action). If all responses from the required contact points are verified for authenticity, and the number and required response levels set by the financial institution are met by the algorithm system, then the financial institution is notified in suitable fashion to allow the transaction. Step G 70, 70A then shows the financial institution sending approval to the point of sale device 70 (the merchant, in other words), as well as the user 70A, to proceed with the transaction. The overall method shown in steps A through G 10, 20, 30, 40, 50, 60, and 70, 70A is undertaken nearly instantaneously, with a general maximum time frame of up to 10 seconds, preferably at most 5 seconds, and most preferably at most 2 seconds. With the algorithm in place to provide the necessary verifications, the system is capable of providing the necessary verifications and responses, etc., with such speed, specifically because of the reliability created by the algorithm itself to ensure such communications are made between the proper individuals and institutions.

Figure 2:
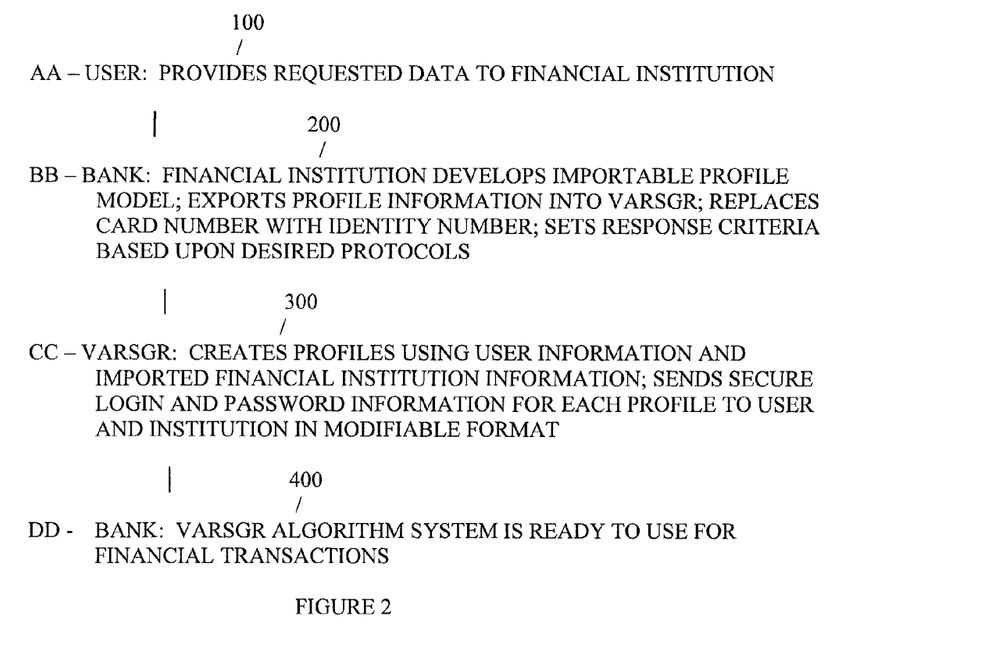
FIG. 2 is a flow chart of an initial set up for the inventive fraud prevention protocol between a financial institution and a bank account holder.

FIG. 2 shows the set-up flow chart to initiate the algorithm system in relation to a specific user and a specific financial institution. Step AA 100 shows the user providing all requested data to the specific financial institution. Such information includes user identity, user account information, user communication information, including cell phone number, email address, etc., to permit electronic media notifications and the like. Such information also includes the collection of information pertaining to desired verification contact points for inputting within the algorithm system. In this manner, as noted above, different levels of security and availability of reliability throughout the overall security protocol may be provided both the user and the financial institution. The algorithm system is able to receive such information, format it, and implement it in relation to the user pursuant to the contact point requirements and verification requests in such a specific manner. Step BB 200 shows the financial institution (again, a bank or other like credit card provider entity) generating a profile model for each user in an individual or, if necessary, corporate (and other like) forms to submit to the algorithm program. Such a profile model may thus include any number of commonly used platforms including, but not limited to, excel and exports profile information. This system may thus permit such a profile model to reliably convert the user's card number into an identity number to prevent any potential problems should a theft attempt (through, for example, hacking of the financial institution's computerized system or even, though highly unexpected, the algorithm system itself in some manner). The financial institution then also sets response criteria and submits the same to the algorithm system in relation to any desired protocols or requirements set by the institution alone or in conjunction with the user's own specifications. As alluded to above, such response criteria may involve differing levels of verification from more or fewer contact points dependent upon location of merchant, amounts of transactions, or other like considerations. Step CC 300 thus shows the algorithm system (here VARSGR, again) receiving such financial institution information of Step BB 200 and creating its own profiles for the individual (or corporate) users (credit card holders). In this manner, and, again, in relation to the specifics required by the financial institution in relation to each individual user, to best ensure reliability of the overall verification process, such profiles should be related to multiple profiles of different verification levels. The algorithm system then sends secure login and password information for each such profile to the financial institution and/or user (as directed by the user and financial institution agreement and/or financial institution policy). In this manner, the user may actually change any contact points for verification purposes as he or she sees fit without any need to notify the financial institution, only the algorithm system. With the password, etc., in place, such modifications, if undertaken, are assured reliability, particularly since the algorithm system will also have the initial communication protocol for such reliability purposes already in place with the specific user, thus indicating all the necessary algorithm requirements for any transactions involving the user and the financial institution are in place Step DD 400. Thus, if a request or response for verification comes from a different communication source than is known by the algorithm system, then such a request will be refused and proper notification to the financial institution and/or other contact points (if available) will be made to alert such an attempt, up front, has been made. In this manner, the system itself is as foolproof as it possibly can be, providing such protections throughout the entirety and over the duration of the account life. Likewise, if the user changes cell phones, email addresses, etc., the algorithm system can be alerted properly and reliably since the algorithm itself will already have the ability to reliably identify the individual through the initial set-up and further contacts. Furthermore, as noted above, if the cell phone and/or email communication protocols are lacking are suspected of an invasive activity to potentially steal an identity or other action, the user further has the capability to provide contact points for verification points through access to an HTML portal(s) via a login and password, again set by the algorithm system or, alternatively, without any necessity for such a login procedure. In any event, once the profiles and VARSGR contact points have been properly established, the algorithm system is ready to use and the user can then utilize his or her credit card as desired with the verification process for reliability for both him- or her-self and the specific financial institution(s), as well.

Such accompanying drawings thus show the base flow charts of the system implemented through the utilization of the inventive string variable algorithm. Certainly, although these are broadly presented, it should be evident that the bank accounts involved may be of any type associated with a transactional capability and/or accepted in a retail setting for payment of any type of good or service. Thus, as noted above, checking accounts, savings accounts, retirement accounts, investment accounts, debit card accounts, credit card accounts, and the like, may be utilized with this system. The term "account" within the invention and description and claims thereof is intended to reflect such a broad concept in this manner. As long as the profile(s) set up with each account provide the necessary verification contact points, the algorithm system verifies such points in relation to the account holder, and the communications and responses are sent to and from the necessary contact points in relation to each transaction, then the system is properly in place and utilized. As well, such profiles may be properly adjusted in terms of the verification contact points required of specific transactions or specific types of transactions for each financial account holder and/or each financial institution. If such modifications to contact point requirements are made subsequent to profile creation (and thus after the subject financial account is set-up between the holder and the servicer), then such changes will automatically require response to requests from the intermediary algorithm system of each contact point within both profiles in order to ensure verification of such a modification. Furthermore, there is basically no limit to the scalability, capability, or utility of this overall system requiring the VARSGR algorithm in order to provide effective communication between parties to a card account transaction is intended with the descriptions and depictions herein, either.

Thus, the preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What is claimed is:

1. A computerized method for substantially eliminating financial account fraud or theft, said method including the utilization of electronic communication devices by a financial institution, a financial account holder, and, optionally, a third party, said method involving an intermediary algorithm system that a) stores within a database profile information pertaining to said financial institution, said financial account holder, and said optional third party as searchable data, b) generates searches of said searchable data upon request of verification of financial account holder identity by said financial institution in relation to a financial transaction, wherein the results of said searches are provided as unique string variables, c) communicates with profile contact points meeting all criteria defined within said search results, and d) verifies contact point identity in relation to said search criteria and said profile information, said method comprising the steps of:

1) initiating a protocol between said financial institution and said financial account holder through said intermediary algorithm system in relation to a financial account held by said financial account holder and serviced by said financial institution, wherein said protocol initiation comprises a) generating at least one financial account holder profile and a financial institution profile within said intermediary algorithm system, said financial account holder profile and said financial institution profile both comprising a client identifier relating to the identity of said financial account holder and verification contact point requirements to be undertaken by said intermediary algorithm system upon utilization of said financial account within a transaction;

2) establishing specific contact point identifications within said intermediary algorithm system through communicating with each required verification contact point within both profiles of said financial account holder and said financial institution;

3) initiating a financial transaction by said financial account holder to transfer funds to or from said financial institution in relation to said financial account holder's account;

4) requesting verification of the identity of said financial account holder by said financial institution through communicating with said intermediary algorithm system prior to completion of said financial transaction;

5) upon receipt of such a request, generating by said intermediary algorithm system search criteria including identifiers related to said requested financial transaction;

6) upon generation of said search criteria, said intermediary algorithm system creating said unique string of variables based upon results of said search criteria, said string including contact point requirements associated with said financial account holder of said financial transaction;

7) said intermediary algorithm system retaining said unique string of variables in order to a) validate profile identities associated with said financial transaction, b) identify all matching profiles meeting said search criteria, and c) identify the search associated with said search criteria;

8) transmitting a request for response from said intermediary algorithm system to each contact point associated with said at least one account holder profile, wherein said request includes said unique string of variables and a request for return of said string variables from each contact point;
9) holding said transaction open by said intermediary algorithm system until verification of said financial account holder identity is completed;
10) receiving at least one response from each contact point by said intermediary algorithm system;
11) confirming the presence of said unique string of variables within said at least one received response by said intermediary algorithm system;
12) confirming the match of each contact point from which said response is received with at least one contact point within said database by said intermediary algorithm system;
13) confirming the match of said account holder profile in comparison with said search criteria of step "5" by said intermediary algorithm system;
14) authorizing said transaction by said intermediary algorithm system if each of steps "11," "12," and "13" are confirmed, wherein if any of said steps "11," "12," or "13" are not confirmed, then said intermediary algorithm system invalidates said financial account holder identity and prohibits said transaction from proceeding; and
15) transferring the result of step "14" from said intermediary algorithm system to each of said financial account holder, said financial institution, and said optional third party;
wherein said method is undertaken through the utilization of at least one computer program within a non-transitory medium.

2. The method of claim 1 wherein said intermediary algorithm system provides all communications to all parties without any required human interaction;
wherein said results transfer of step "15" is undertaken without the need for any input or disclosure of any personal information of said financial account holder to said financial institution and/or said optional third party; and
wherein no financial account information is shared with nor stored within said intermediary algorithm system.

3. The method of claim 1 wherein said financial account holder profile includes more than one verification contact point requirement per each account transaction.

4. The method of claim 1 wherein said financial institution profile includes more than one verification contact point requirement per each account transaction.

5. The method of claim 1 wherein the number and level of verification contact points requirements per account transaction within said financial account holder's profile are modifiable by said financial account holder subsequent to initial intermediary algorithm system profile set-up.

6. The method of claim 5 wherein the number and level of verification contact points requirements per account transaction within said financial institution's profile are modifiable by said financial institution subsequent to initial intermediary algorithm system profile set-up.

7. The method of claim 1 wherein said optional third party is present therein and wherein step "3" involves a transaction including said third party to transfer financial account holder account funds from said financial institution to said third party.

8. The method of claim 2 wherein said optional third party is present therein and wherein step "3" involves a transaction to transfer financial account holder account funds from said financial institution to said third party.

9. The method of claim 3 wherein said optional third party is present therein and wherein step "3" involves a transaction to transfer financial account holder account funds from said financial institution to said third party.

10. The method of claim 4 wherein said optional third party is present therein and wherein step "3" involves a transaction to transfer financial account holder account funds from said financial institution to a third party.

11. The method of claim 5 wherein said optional third party is present and wherein step "3" involves a transaction to transfer financial account holder account funds from said financial institution to a third party.

12. The method of claim 6 wherein said optional third party is present and wherein step "3" involves a transaction to transfer financial account holder account funds from said financial institution to a third party.

13. The method of claim 1 wherein said optional third party is present and is selected from the group consisting of an individual other than said financial account holder, a corporate entity other than said financial account holder, a merchant, and the same or a different financial institution than that servicing said financial account holder account.

14. The method of claim 2 wherein said optional third party is present and is selected from the group consisting of an individual other than said financial account holder, a corporate entity other than said financial account holder, a merchant, and the same or a different financial institution than that servicing said financial account holder account.

15. The method of claim 3 wherein said optional third party is present and is selected from the group consisting of an individual other than said financial account holder, a corporate entity other than said financial account holder, a merchant, and the same or a different financial institution than that servicing said financial account holder account.

16. The method of claim 4 wherein said optional third party is present and is selected from the group consisting of an individual other than said financial account holder, a corporate entity other than said financial account holder, a merchant, and the same or a different financial institution than that servicing said financial account holder account.

17. The method of claim 5 wherein said optional third party is present and is selected from the group consisting of an individual other than said account holder, a corporate entity other than said account holder, a merchant, and the same or a different financial institution than that servicing said financial account holder account.

18. The method of claim 6 wherein said optional third party is present and is selected from the group consisting of an individual other than said account holder, a corporate entity other than said account holder, a merchant, and the same or a different financial institution than that servicing said financial account holder account.

19. The method of claim 13 wherein step "3" involves a transaction to transfer financial account holder account funds from said financial institution to said third party.

20. The method of claim 14 wherein step "3" involves a transaction to transfer financial account holder account funds from said financial institution to said third party.

* * * * *